US012110800B2

(12) United States Patent
Nedunuri et al.

(10) Patent No.: US 12,110,800 B2

(45) Date of Patent: Oct. 8, 2024

(54) CLEARANCE CONTROL OF FAN BLADES IN A GAS TURBINE ENGINE

(71) Applicant: General Electric Company, Schenectady, NY (US)

(72) Inventors: Venkata Jayateja Nedunuri, Bengaluru Karnataka (IN); Abhijeet Yadav, Bengaluru Karnataka (IN); Shawn P. Riley, Evendale, OH (US); Richa Awasthi, Bengaluru Karnataka (IN); Nilesh Vilas Varote, Bengaluru Karnataka (IN); Ravindra Shankar Ganiger, Bengaluru Karnataka (IN); Anusrita Raychaudhuri, Bengaluru Karnataka (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/321,491

(22) Filed: May 22, 2023

(65) Prior Publication Data

US 2023/0340887 A1 Oct. 26, 2023

Related U.S. Application Data

(63) Continuation of application No. 17/840,293, filed on Jun. 14, 2022, now Pat. No. 11,655,724.

(30) Foreign Application Priority Data

Apr. 25, 2022 (IN) ............................ 202211024228

(51) Int. Cl.
*F01D 11/22* (2006.01)

(52) U.S. Cl.
CPC ........ *F01D 11/22* (2013.01); *F05D 2220/323* (2013.01); *F05D 2240/515* (2013.01)

(58) Field of Classification Search
CPC .......... F01D 11/22; F01D 11/20; F01D 11/16; F01D 11/14; F05D 2220/323; F05D 2240/515
See application file for complete search history.

(56) References Cited

U.S. PATENT DOCUMENTS 5,263,816 A 11/1993 Weimer et al.
6,543,992 B2 4/2003 Webster
(Continued)

FOREIGN PATENT DOCUMENTS

FR 3129428 A1 5/2023
FR 3129432 A1 5/2023
(Continued)

OTHER PUBLICATIONS

United States Patent and Trademark Office, "Notice of Allowance," issued in U.S. Appl. No. 17/840,293 on Jan. 12, 2023 (8 pages).

*Primary Examiner* — Jacob M Amick
(74) *Attorney, Agent, or Firm* — Hanley, Flight & Zimmerman, LLC

(57) ABSTRACT

Clearance control systems with electromagnetic actuators are disclosed. An example electromagnetically-actuated clearance control system for a gas turbine engine comprises an electromagnetic coil coupled to a first end of a facesheet, the electromagnetic coil to generate a magnetic field in response to a connection of a power supply, a ferromagnetic sheet coupled to a second end of the facesheet, the ferromagnetic sheet drawn radially-inward toward the electromagnetic coil when the magnetic field is generated, a first end of the ferromagnetic sheet coupled to a first compression spring and a second end of the ferromagnetic sheet coupled to a second compression spring, the first and second compression springs to compress in response to the ferromagnetic sheet being drawn radially-inward.

18 Claims, 10 Drawing Sheets

(56) References Cited

U.S. PATENT DOCUMENTS

| | | | | |
|---|---|---|---|---|
| 8,133,003 | B2 | 3/2012 | Davi et al. | |
| 8,177,476 | B2 | 5/2012 | Philip et al. | |
| 9,309,777 | B2 | 4/2016 | Webster et al. | |
| 10,280,784 | B2 | 5/2019 | McCaffrey | |
| 10,557,367 | B2 | 2/2020 | Blaney et al. | |
| 11,655,724 | B1 | 5/2023 | Nedunuri et al. | |
| 2009/0297330 | A1 | 12/2009 | Razzell et al. | |
| 2010/0303612 | A1 * | 12/2010 | Bhatnagar | F01D 11/22 415/127 |
| 2016/0177778 | A1 * | 6/2016 | Carter | H01P 3/14 415/118 |
| 2020/0350805 | A1 * | 11/2020 | Torrey | F03D 1/065 |

FOREIGN PATENT DOCUMENTS

| | | | |
|---|---|---|---|
| FR | 3130879 | A1 | 6/2023 |
| FR | 3130894 | A1 | 6/2023 |
| FR | 3132743 | A1 | 8/2023 |
| GB | 2440744 | A | 2/2008 |

* cited by examiner

CLEARANCE CONTROL OF FAN BLADES IN A GAS TURBINE ENGINE

CROSS-REFERENCE TO RELATED APPLICATIONS

This patent arises from a continuation of U.S. patent application Ser. No. 17/840,293 (now U.S. Pat. No. 11,655,724), which was filed on Jun. 14, 2022, which claims priority to Indian Provisional Patent Application No. 2022/11024228, which was filed on Apr. 25, 2022. U.S. patent application Ser. No. 17/840,293 and Indian Provisional Patent Application No. 2022/11024228 are each hereby incorporated herein by reference in their entirety. Priority to U.S. patent application Ser. No. 17/840,293 and to Indian Provisional Patent Application No. 2022/11024228 is hereby claimed.

FIELD OF THE DISCLOSURE

This disclosure relates generally to clearance control for fan blades in a gas turbine, and, more particularly, to clearance control of fan blades in a gas turbine engine.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

In particular configurations, the compressor section includes, in serial flow order, a high pressure (HP) compressor and a low pressure (LP) compressor. Similarly, the turbine section includes, in serial flow order, a high pressure (HP) turbine and a low pressure (LP) turbine. The HP compressor, LP compressor, HP turbine, and LP turbine include a one or more axially spaced apart rows of circumferentially spaced apart rotor blades. Each rotor blade includes a rotor blade tip. One or more shrouds may be positioned radially outward from and circumferentially enclose the rotor blades.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which.

Figure 1:
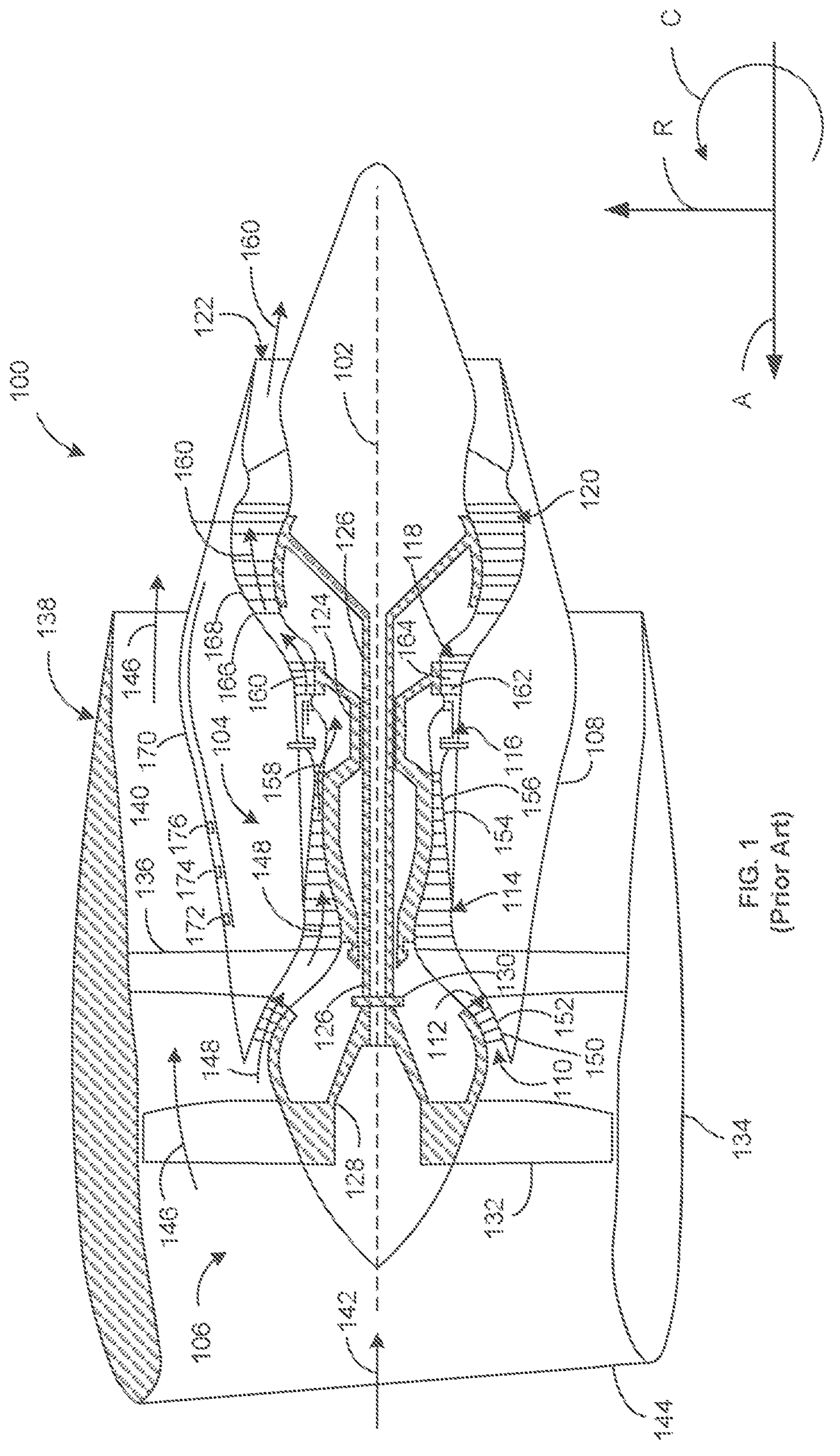
FIG. 1 (Prior Art)
FIG. 1 illustrates a cross-sectional view of a prior gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Known clearance control systems for fan blades within gas turbine engines include materials that provide a physical deflection response when a load is applied (e.g., when a blade comes into contact with a casing, shroud, etc.). Example clearance control systems disclosed herein utilize an electromagnetically-driven actuation mechanism wherein the clearance is actively monitored and adjusted through use of an electromagnetic field, in conjunction with a ferromagnetic sheet coupled to at least a facesheet and a set of springs. In some examples, the clearance control system is configured to widen a clearance (e.g., a clearance between the fan blade and fan casing) when aircraft cruise conditions cause the fan blade to expand towards the fan casing, preventing the blade from making significant contact. Additionally, example electromagnetically-actuated clearance control systems disclosed herein include a series of compression and/or leaf springs, which further assist the control mechanism in widening/narrowing the clearance in response to flight conditions. Examples disclosed herein may additionally include proximity sensors to actively monitor fan blade expansion and/or retraction to drive the electromagnetically-actuated clearance control system response.

Various terms are used herein to describe the orientation of features. As used herein, the orientation of features, forces and moments are described with reference to the yaw axis, pitch axis, and roll axis of the vehicle associated with the features, forces, and moments. In general, the attached figures are annotated with reference to the axial direction, radial direction, and circumferential direction of the gas turbine associated with the features, forces, and moments. In general, the attached figures are annotated with a set of axes including the roll axis R, the pitch axis P, and the yaw axis Y. As used herein, the terms "longitudinal," and "axial" are used interchangeably to refer to directions parallel to the roll axis. As used herein, the term "lateral" is used to refer to directions parallel to the pitch axis. As used herein, the term "vertical" and "normal" are used interchangeably to refer to directions parallel to the yaw axis.

In some examples used herein, the term "substantially" is used to describe a relationship between two parts that are within three degrees of the stated relationship (e.g., a substantially colinear relationship is within three degrees of being linear, a substantially perpendicular relationship is within three degrees of being perpendicular, a substantially parallel relationship is within three degrees of being parallel, etc.). As used herein, the term "linkage" refers to a connection between two parts that restrain the relative motion of the two parts (e.g., restrain at least one degree of freedom of the parts, etc.). "Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Many gas turbine engine architectures include fan casings circumferentially enclosing the rotor blades of the engine. The proximity of the rotor blades to the casing results in frequent physical contact between the blades and casing, particularly when flight conditions cause the fan blades to expand and come into contact with the casing, causing eventual blade tip loss.

Examples disclosed herein are intended to overcome the above-referenced deficiencies via use of electromagnets coupled to a sheet (e.g., facesheet, kinetic plate, etc.) to act as a clearance control system (referred to herein as an electromagnetically-actuated clearance control system). The electromagnetically-actuated clearance control system, in examples disclosed herein, allows for a narrowing and/or widening of the clearance between the blades and casing, in response to an expansion and/or reduction of the fan blades based on flight conditions (e.g., the expansion and/or reduction monitored by proximity sensors). The importance of this clearance control system is observed, for example, to prevent blade tip loss when a rotor blade rubs against the fan casing. The electromagnets, in conjunction with abradable materials, compression and/or leaf springs, and/or proximity sensors, allows for the dynamic mitigation of blade tip loss as flight conditions change, and acts as an active clearance control system.

Referring now to the drawings, wherein identical numerals indicate the same elements throughout the figures, FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114

("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween. Certain flight conditions (e.g., increase in engine temperature, decrease in engine temperature, etc.) may cause the plurality of fan blades 132 to expand radially-outward from the fan shaft 128 towards the nacelle 134 or may cause the plurality of fan blades 132 to retract radially-inward towards the fan shaft 128 and away from the nacelle 134. The expansion and/or retraction of the plurality of fan blades 132 in response to changing flight conditions can result in tip loss of the plurality of fan blades 132, and/or other unwanted damage to the component, if a dynamic clearance (e.g., gap) is not maintained between the plurality of fan blades 132 and the nacelle 134.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106. FIG. 1 further includes a cowling 170 and offset-arch gimbals 172-176. The cowling 170 is a covering which may reduce drag and cool the engine. The offset-arch gimbals 172-176 may, for example, include infrared cameras to detect a thermal anomaly in the under-cowl area of the engine 100.

Figure 2:
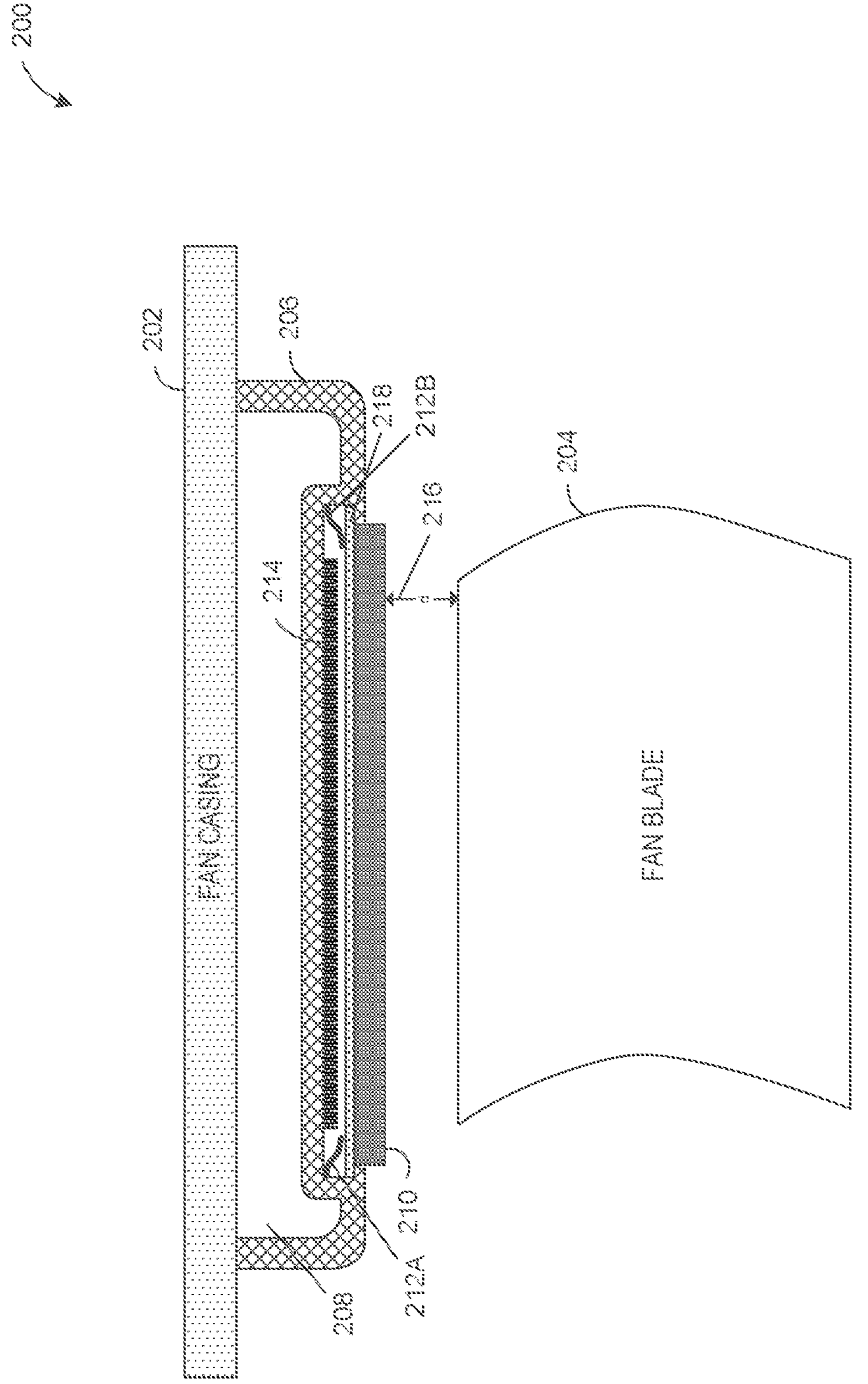
FIG. 2 depicts a one-dimensional example of an electromagnetically-actuated clearance control system, implemented in accordance with the teachings of this disclosure.

FIG. 2 depicts a one-dimensional example of an electromagnetically-actuated clearance control system 200, implemented in accordance with the teachings of this disclosure. The example electromagnetically-actuated clearance control system 200 includes an example fan casing/nacelle 202, an example fan blade 204, an example facesheet 206, an example honeycomb structure 208, an example abradable material 210, an example first spring 212A, an example second spring 212B, an example electromagnetic system 214, an example clearance 216, and an example ferromagnetic sheet 218.

The example facesheet 206 is coupled to the fan casing 202 to provide a structure upon which the electromagnetic system 214 is coupled. Additionally, the example facesheet 206 may also be used as a structure to absorb impact from a blade (e.g., ice impact, etc.) without damaging the blade and/or blade tip (e.g., through use of abradable material). In examples disclosed herein, the facesheet 206 encloses a honeycomb structure 208, the honeycomb structure 208 provides a rigidity to the facesheet 206 that allows for the facesheet 206 to remain stable under changing flight conditions. In examples disclosed herein, the example honeycomb structure 208 is used to provide a sound dampening effect and/or a blade tip damage mitigating effect in a blade out event (e.g., when flight conditions cause a fan blade to break off within an engine) through its collapsible nature. The example ferromagnetic sheet 218 is coupled on either end to the first and second springs, 212A and 212B, respectively. The first and second springs, 212A and 212B, respectively, compress when the ferromagnetic sheet 218 is drawn inwards towards the electromagnetic system 214 to widen the clearance 216, when the electromagnetic system 214 is activated in response to the fan blade 204 expanding under flight conditions. In some examples disclosed herein, the electromagnetic system 214 includes a set of proximity sensors (not shown in the example of FIG. 2 but including, for example, proximity sensor 602 described further in conjunction with FIGS. 6A and/or 6B). The example abradable material 210 (e.g., foil, ring, etc.) is coupled to the ferromagnetic sheet 218 and positioned radially outward from the fan blade 204 to create the clearance 216 between the fan casing 202 and the fan blade 204. In examples disclosed herein, the example electromagnetic system 214 is an electromagnetic coil configured to generate a magnetic field when a power supply is turned on, and the power supply is to be turned on in response to flight conditions wherein the fan blade 204 is expanding towards the fan casing 202. Additionally, in examples disclosed herein, the ferromagnetic sheet 218 may utilize any materials that are able to respond to magnetization by the electromagnetic system 214 (e.g., iron, cobalt, nickel, etc.). In the example of FIG. 2, the clearance 216 is shown as distance “d,” which can be quantified as any distance between the abradable material 210 and the fan blade 204.

Figure 3:
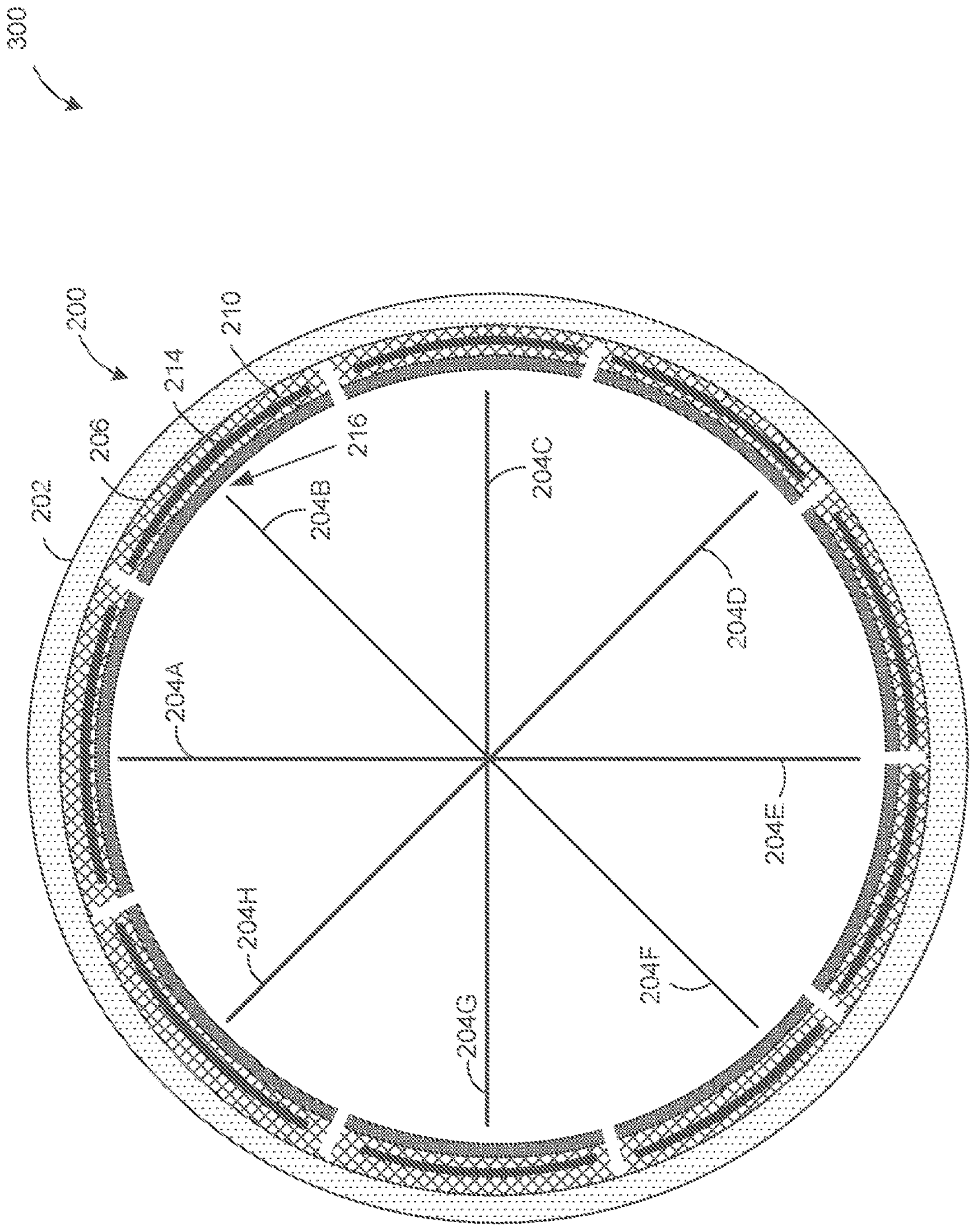
FIG. 3 illustrates an example positioning of the electromagnetically-actuated clearance control system of FIG. 2 within an example rotor.

FIG. 3 illustrates an example positioning of the electromagnetically-actuated clearance control system 200 of FIG. 2 within an example rotor 300, in accordance with the teachings of this disclosure. In examples disclosed herein, the example electromagnetically-actuated clearance control system 200, including the example fan casing 202, example facesheet 206, example abradable material 210, example electromagnetic system 214, and example clearance 216 of FIG. 2, is positioned to circumferentially enclose the example fan blades 204A, 204B, 204C, 204D, 204E, 204F, 204G, and 204H approximately every 30 degrees of the rotor 300.

Figure 4:
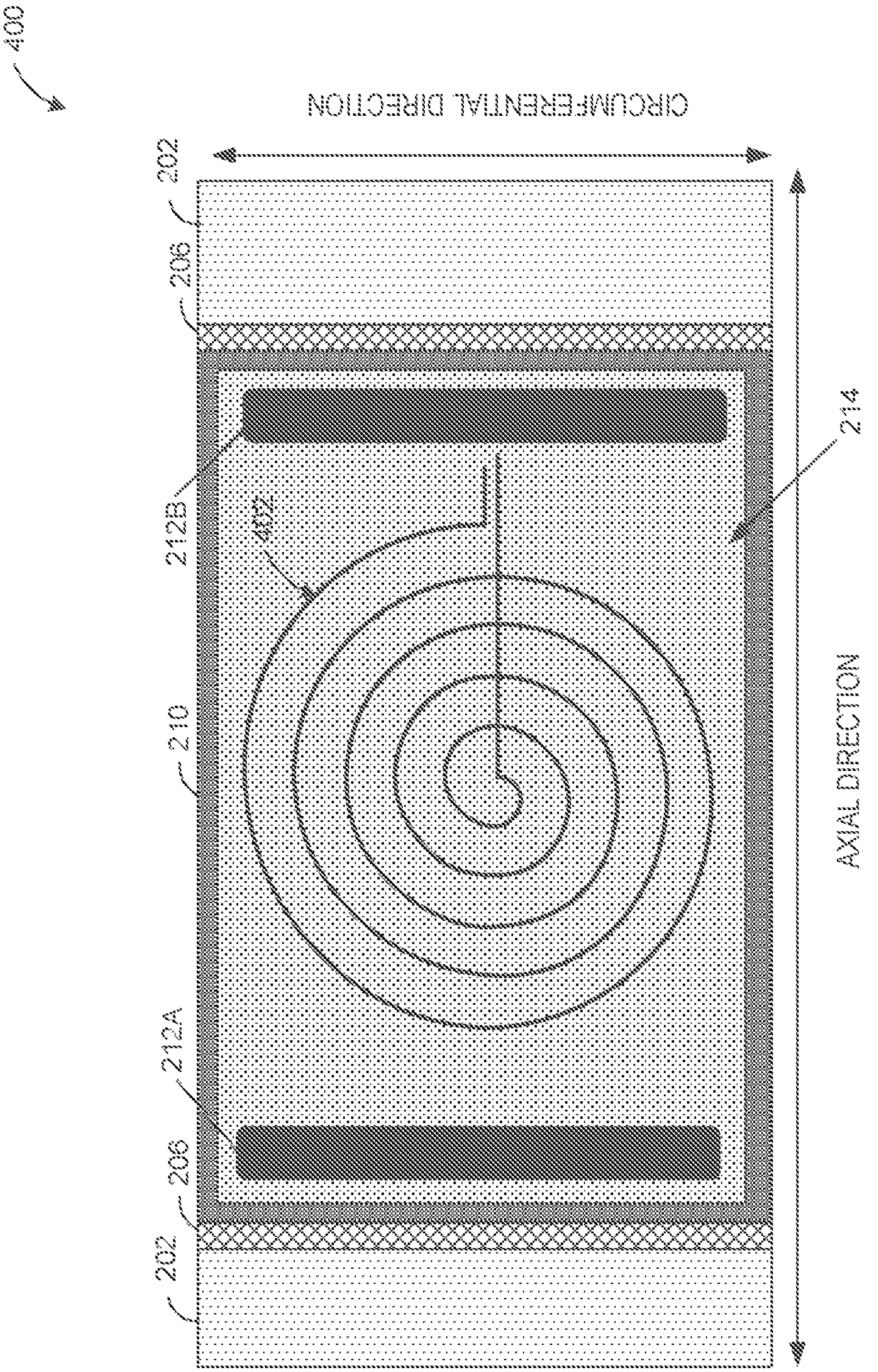
FIG. 4 illustrates an example magnetic field generating system, including a cross-sectional view of the example electromagnetically-actuated clearance control system of FIGS. 2 and/or 3.

FIG. 4 illustrates an example magnetic field generating system 400, including a cross-sectional view of the example electromagnetically-actuated clearance control system 200 of FIGS. 2 and/or 3. The example magnetic field generating system 400 includes an example electromagnetic coil 402, the electromagnetic coil 402 configured to generate a magnetic field when connected to a power supply (e.g., the Full Authority Digital Engine Control (FADEC)). In examples disclosed herein, the electromagnetic coil 402 is additionally configured to lie within the electromagnetic system 214 described in FIG. 2. Additionally, in operation, the example magnetic field generating system 400 is dependent on a current supplied by the power supply (e.g., FADEC), to generate a magnetic field in response to an indication of a widening and/or narrowing of the clearance 216 of FIG. 2. As described in FIG. 2, when the electromagnetic coil 402 is provided current for activation, the ferromagnetic sheet 218 of FIG. 2 is drawn inwards towards the electromagnetic system 214 of FIG. 2 to widen the clearance 216 of FIG. 2.

Figure 5:
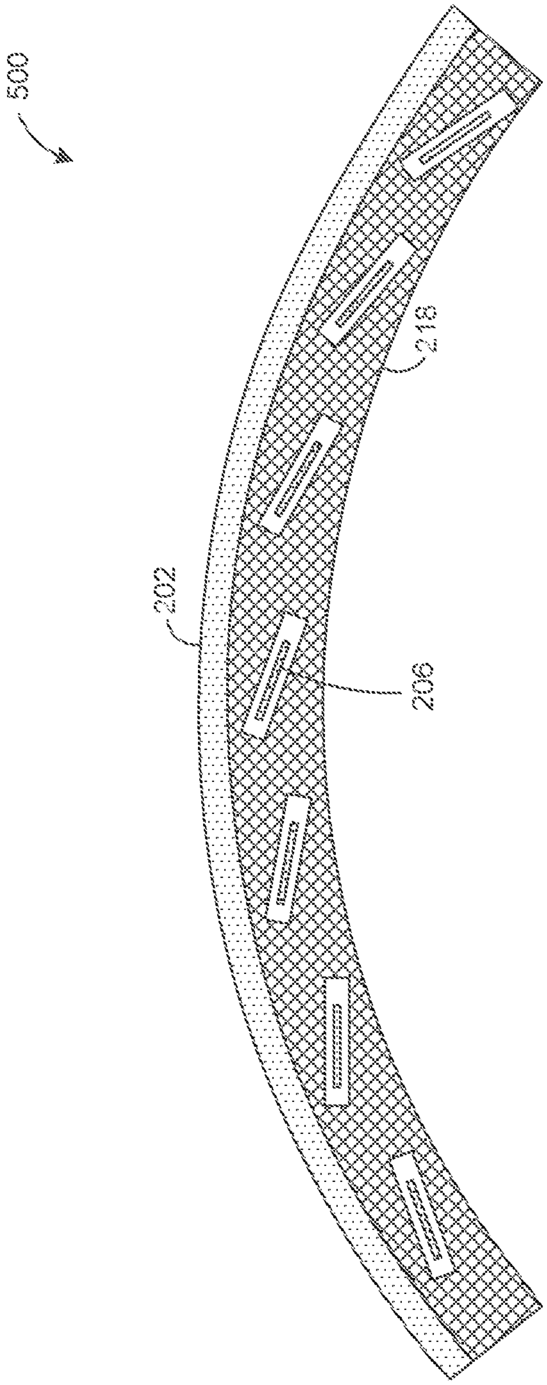
FIG. 5 illustrates an example coupling of the example ferromagnetic sheet to the example facesheet of FIG. 2.

FIG. 5 illustrates an example wedge-shaped coupling 500 of the example ferromagnetic sheet 218 to the example facesheet 206 of FIG. 2. The wedge-shape coupling 500 locks the facesheet 206 to the ferromagnetic sheet 218 in a given radial position along the fan casing 202 of FIG. 2. In examples disclosed herein, the radial position is held in place by the wedge-shape coupling 500 to minimize use of power provided via the example FADEC system in maintaining a fixed position of the facesheet 206, relative to the fan casing 202.

Figure 6A:
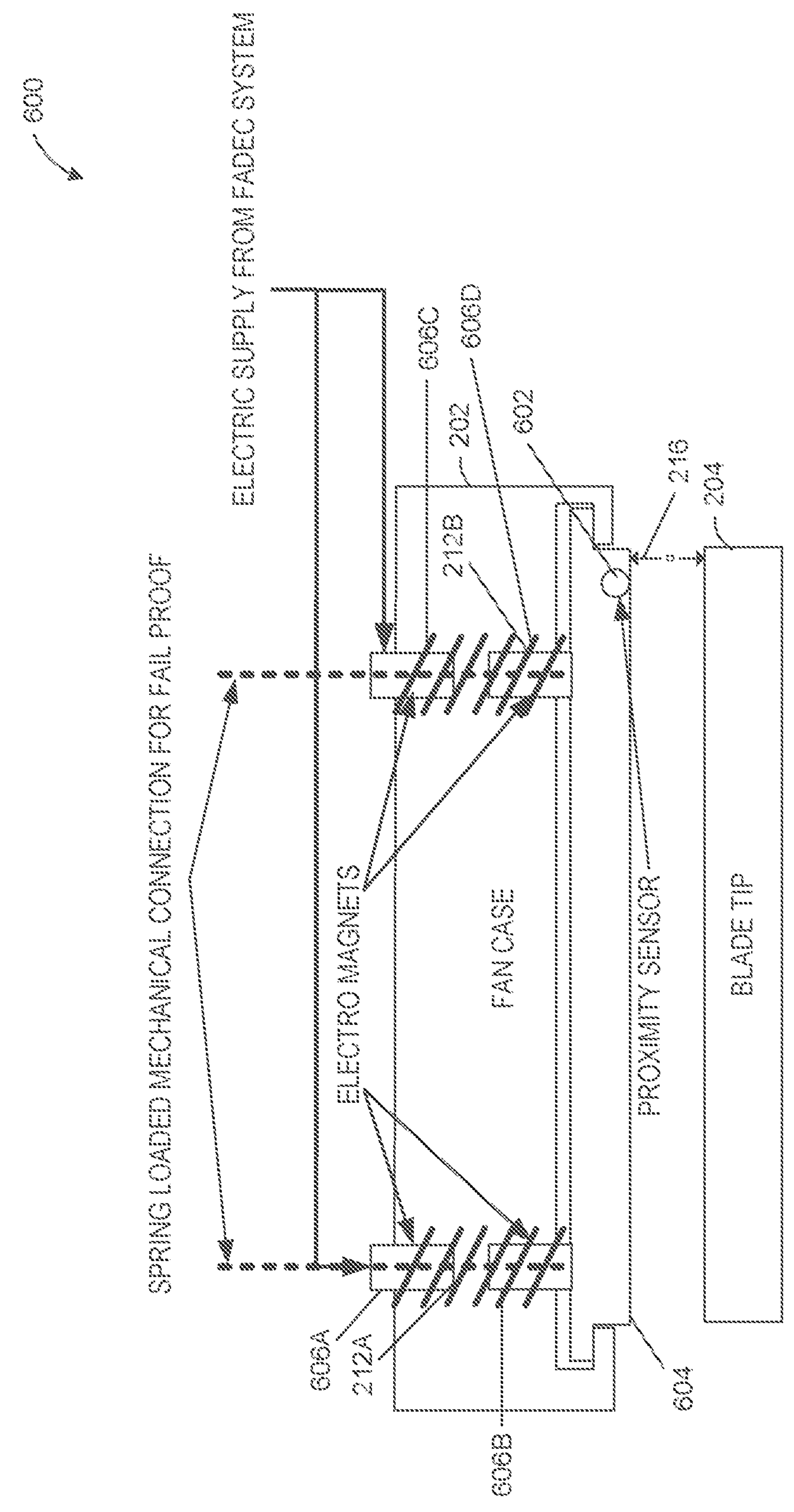
FIG. 6A illustrates an example second electromagnetically-actuated clearance control system including an example kinetic plate and an example proximity sensor, the example kinetic plate depicted in a radially-inward position.

FIG. 6A illustrates an example second electromagnetically-actuated clearance control system 600. The example second electromagnetically-actuated clearance control system 600 includes the example fan casing 202, the example fan blade 204, the example first spring 212A, the example second spring 212B, and the example clearance 216 of FIG. 2. In examples disclosed herein, the example second electromagnetically-actuated clearance control system 600 additionally includes an example proximity sensor 602, an example kinetic plate 604, an example first electromagnet 606A, an example second electromagnet 606B, an example third electromagnet 606C, and an example fourth electromagnet 606D. In examples disclosed herein, the second electromagnetically-actuated clearance control system 600 is segmented along the circumference of the fan casing 202, as depicted in FIG. 3

In examples disclosed herein, the proximity sensor 602 is configured to rest along the kinetic plate 604 and the proximity sensor 602 is configured to measure the distance between the kinetic plate 604 and the fan blade 204 (e.g., measuring the width of the clearance 216). The first electromagnet 606A and second electromagnet 606B are positioned against the same pole (e.g., the north pole of the first electromagnet 606A is configured to face the north pole of the second electromagnet 606B), causing the first and second electromagnets, 606A and 606B, respectively to repel against each other. The repelling first and second electromagnets, 606A and 606B, respectively are held in place and/or compressed by the first spring 212A, the first spring 212A to compress and decompress in response to the measured clearance 216 by the proximity sensor 602. Similarly, the third electromagnet 606C and fourth electromagnet 606D are positioned against the same pole (e.g., the north pole of the third electromagnet 606C is configured to face the north pole of the fourth electromagnet 606D), causing the third and fourth electromagnets, 606C and 606D, respectively to repel against each other. The repelling third and fourth electromagnets, 606C and 606D, respectively are held in place and/or compressed by the second spring 212B, the second spring 212B to compress and decompress in response to the measured clearance 216 by the proximity sensor 602.

In examples disclosed herein, the second electromagnet 606B and fourth electromagnet 606D are coupled to the kinetic plate 604, the first, second, third, and fourth electromagnets, 606A, 606B, 606C, and 606D, respectively configured to generate a magnetic field when connected to a power supply (e.g., FADEC). In response to a reading of the proximity sensor 602, the first and second springs, 212A and 212B, respectively, compress and/or decompress against the first and third electromagnets, 606A and 606C, respectively, to repel against the second and fourth electromagnets, 606B and 606D, respectively, to move the kinetic plate 604. Additionally, in examples disclosed herein, the kinetic plate 604 is housed within the fan casing 202, to widen and/or narrow the clearance 216 to mitigate tip loss of the example fan blade 204.

The kinetic plate 604, as depicted in FIG. 6A, is shown in a radially-inward position, thus widening the clearance 216. As shown in the example of FIG. 6A, the kinetic plate 604 moves radially-inward in response to a reading from the proximity sensor 602 that indicates that the example fan blade 204 is expanding towards the fan casing 202. The radially-inward movement of the kinetic plate 604 is facilitated by the compression of the first and second spring, 212A and 212B, respectively. The first spring 212A is coupled to the first electromagnet 606A to repel the second electromagnet 606B. The second electromagnet 606B is coupled to a first end of the kinetic plate 604. The second spring 212B is coupled to the third electromagnet 606C to repel the fourth electromagnet 606D. The fourth electromagnet is coupled to a second end of the kinetic plate 604, which causes the kinetic plate 604 to shift radially-inwards towards the fan casing 202 (e.g., widening the clearance 216).

Additionally, in examples disclosed herein, variable clearance is maintained along the length of the example fan blade (e.g., fan blade 204 of FIG. 2). The first and second electromagnets, 606A and 606B, respectively, may be configured to move with a different displacement than the third and fourth electromagnets, 606C and 606D, respectively, the difference in displacement tilting the kinetic plate 604 such that any variable clearance along the blade length is maintained.

Figure 6B:
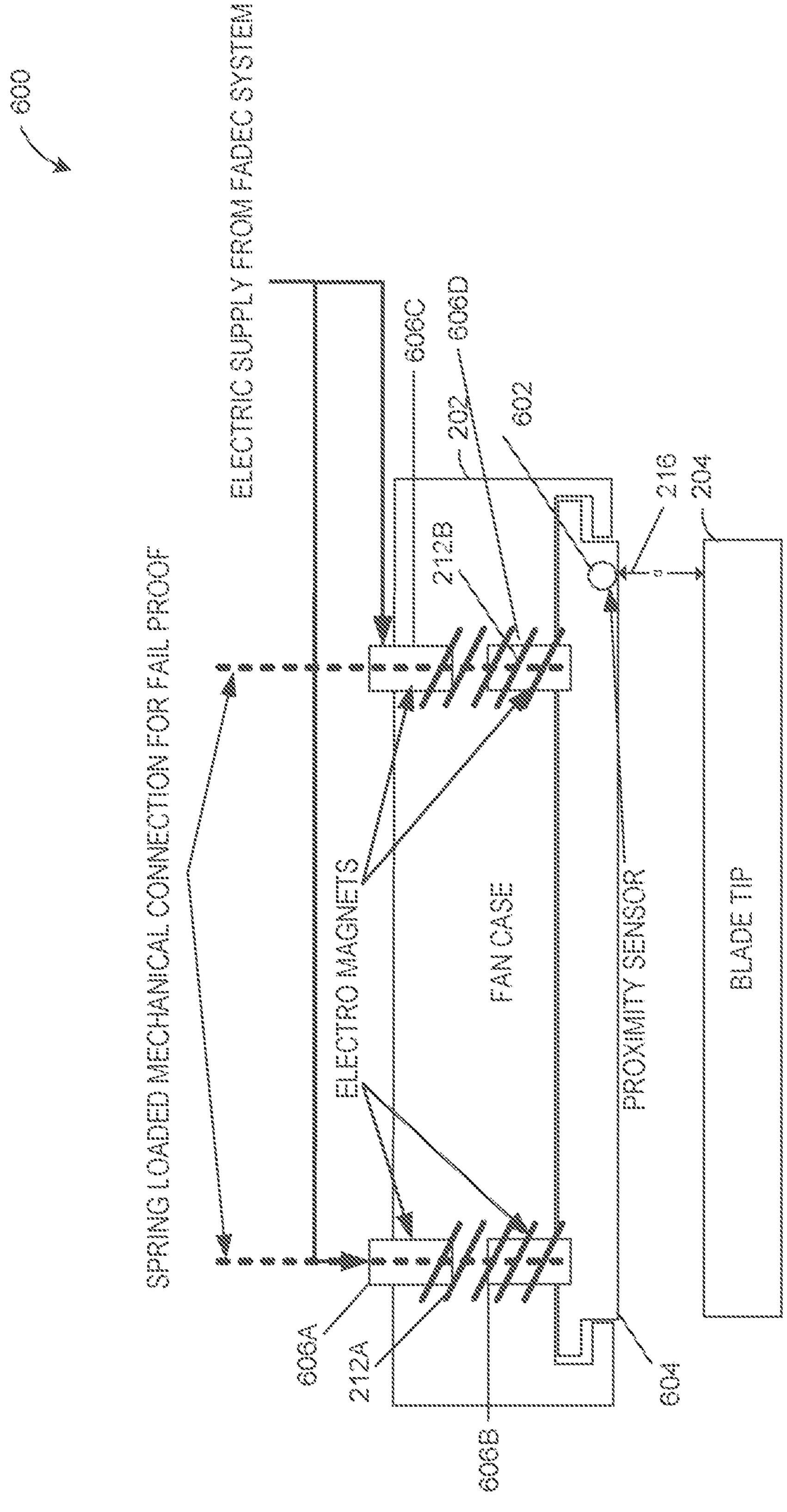
FIG. 6B illustrates the example second electromagnetically-actuated clearance control system of FIG. 6A using the example kinetic plate and the example proximity sensors, the example kinetic plate depicted in a radially-outward position.

FIG. 6B illustrates a second configuration of the example second electromagnetically-actuated clearance control system 600 of FIG. 6B. The kinetic plate 604, as depicted in FIG. 6B, is shown in a radially-outward position, thus narrowing the clearance 216 in response to a reading from the proximity sensor 602 that indicates that the example fan blade 204 is retracting away from the fan casing 202. The radially-outward movement of the kinetic plate 604 is facilitated by the decompression of the first and second springs, 212A and 212B, respectively. The first spring 212A is coupled to the first electromagnet 606A to repel the second electromagnet 606B. The second electromagnet is coupled to a first end of the kinetic plate 604. The second spring 212B is coupled to the third electromagnet 606C to repel the fourth electromagnet 606D. The fourth electromagnet is coupled to a second end of the kinetic plate 604 to cause the kinetic plate 604 to shift radially-outwards away from the fan casing 202 (e.g., narrowing the clearance 216).

Figure 7:
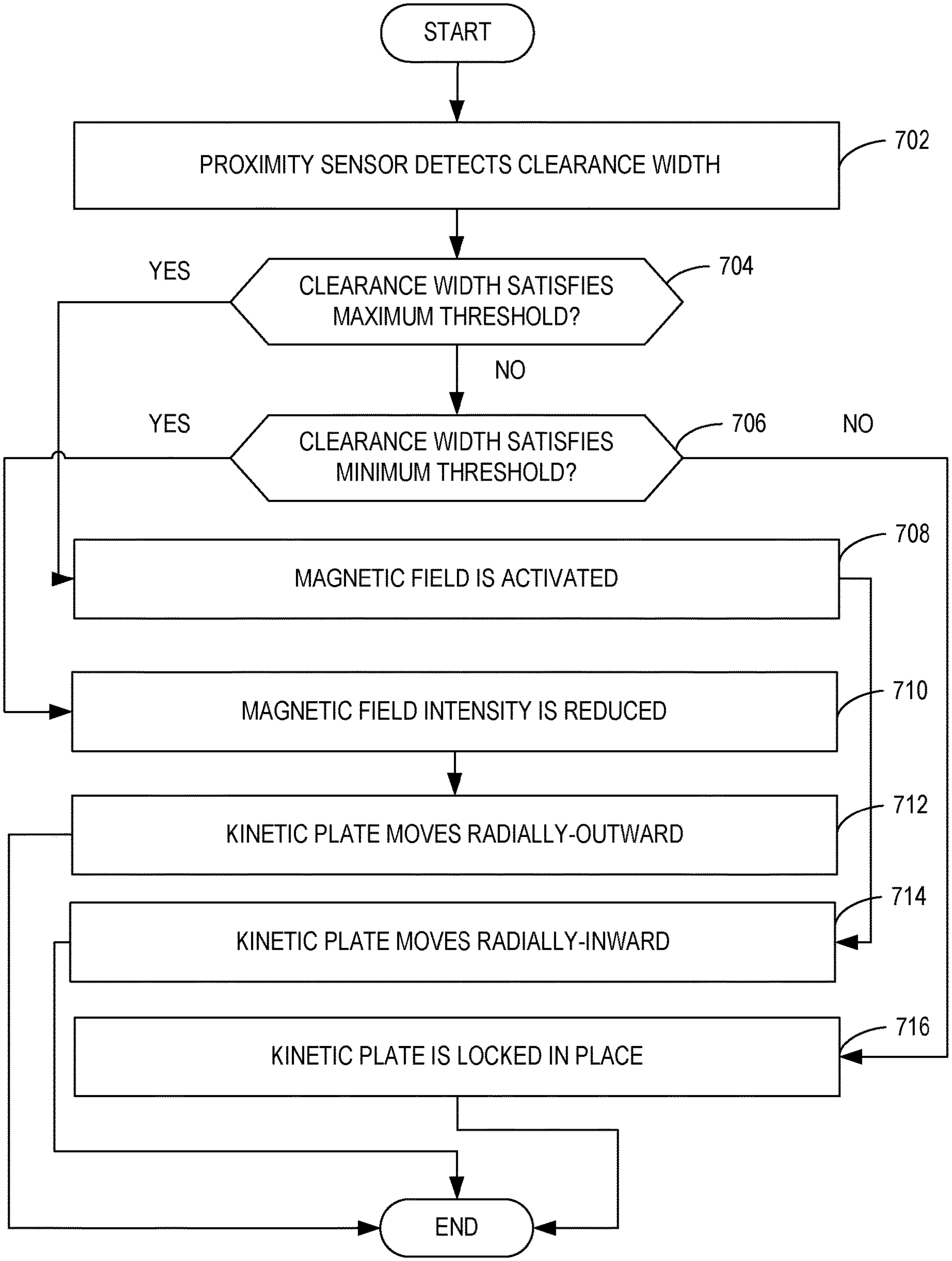
FIGS. 7-8 are flowcharts representing machine-readable instructions to execute the example electromagnetically-actuated clearance control system of FIG. 2.

A flowchart representative of example hardware logic circuitry, machine readable instructions, hardware implemented state machines, and/or any combination thereof for implementing the example second electromagnetically-actuated clearance control system 600 of FIGS. 6A-B is shown in FIG. 7. The machine readable instructions may be one or more executable programs or portion(s) of an executable program for execution by processor circuitry, such as the processor circuitry 912 shown in the example processor platform 900 discussed below in connection with FIG. 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example second electromagnetically-actuated clearance control system 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to actively monitor widening and/or narrowing of the clearance 216 and provide a response to mitigate blade tip loss. The machine readable instructions and/or the operations 700 of FIG. 7 begin at block 702, at which the processor circuitry 912 shown in the example processor platform 900 discussed below in connection with FIG. 9 causes the proximity sensors to detect the width of the clearance 216.

At block 704, as shown in FIG. 7, the processor circuitry 912 determines whether the width of the clearance 216, as measured in block 702, is greater than a first threshold (e.g., 0.010 inches, 0.020 inches, 0.030 inches, 0.050 inches, etc.) (e.g., indicating that the clearance 216 has widened beyond the first threshold value, such as a maximum threshold value). In examples disclosed herein, the width of clearance 216 may be measured in inches, centimeters, and/or any other unit of measurement. When the clearance 216 is determined to not be greater than the first threshold, the process moves forward to block 706. However, when the clearance 216 is determined to be greater than the first threshold, the process moves to block 708.

At block 708, the processor circuitry 912 establishes whether the width of the clearance 216, as measured in block 702, is less than a second threshold value (e.g., 0.005 inches, 0.006 inches, 0.007 inches, 0.008 inches, etc.) (e.g., indicating that the clearance has narrowed beyond the second threshold value, such as a minimum threshold value). In examples disclosed herein, the width of clearance 216 may be measured in inches, centimeters, and/or any other unit of measurement When the clearance 216 is determined to not be less than the second threshold, the process moves forward to block 710. However, when the clearance 216 is determined to be less than the second threshold, the process moves to block 716.

At block 708, in response to having determined at block 704 that the width of the clearance 216 is greater than the first threshold, the processor circuitry 912 causes the magnetic field of the example first, second, third, and/or fourth electromagnets, 606A, 606B, 606C, and 606D, respectively, to be activated. In examples disclosed herein, the magnetic field is activated by connecting the first, second, third, and fourth electromagnets, 606A, 606B, 606C, and 606D, respectively, to a power supply (e.g., FADEC).

At block 710, in response to having determined at block 706 that the width of the clearance 216 is less than the second threshold, the processor circuitry 912 causes the magnetic field of the example first, second, third, and/or fourth electromagnets, 606A, 606B, 606C, and 606D, respectively, to be reduced. In some examples, the magnetic field may be deactivated by the processor circuitry 912 by disconnecting the first, second, third, and fourth electromagnets, 606A, 606B, 606C, and 606D, respectively from the power supply.

At block 712, in response to the magnetic field having been reduced in intensity by the processor circuitry 912 at block 710, the kinetic plate 604 moves radially-inward, as described further in conjunction with FIG. 6A, to narrow the width of the clearance 216, as illustrated in FIG. 2.

At block 714, in response to the magnetic field having been activated by the processor circuitry 912 (at block 708), the kinetic plate 604 moves radially-outward, as described further in conjunction with FIG. 6A, to widen the width of the clearance 216, as illustrated in FIG. 2.

At block 716, in response to the processor circuitry 912 having determined that the measured width of the clearance 216 falls within the range of a minimum threshold and maximum threshold (e.g., the first and second thresholds), the kinetic plate 604 is locked in place to neither narrow nor widen the clearance 216.

Figure 8:
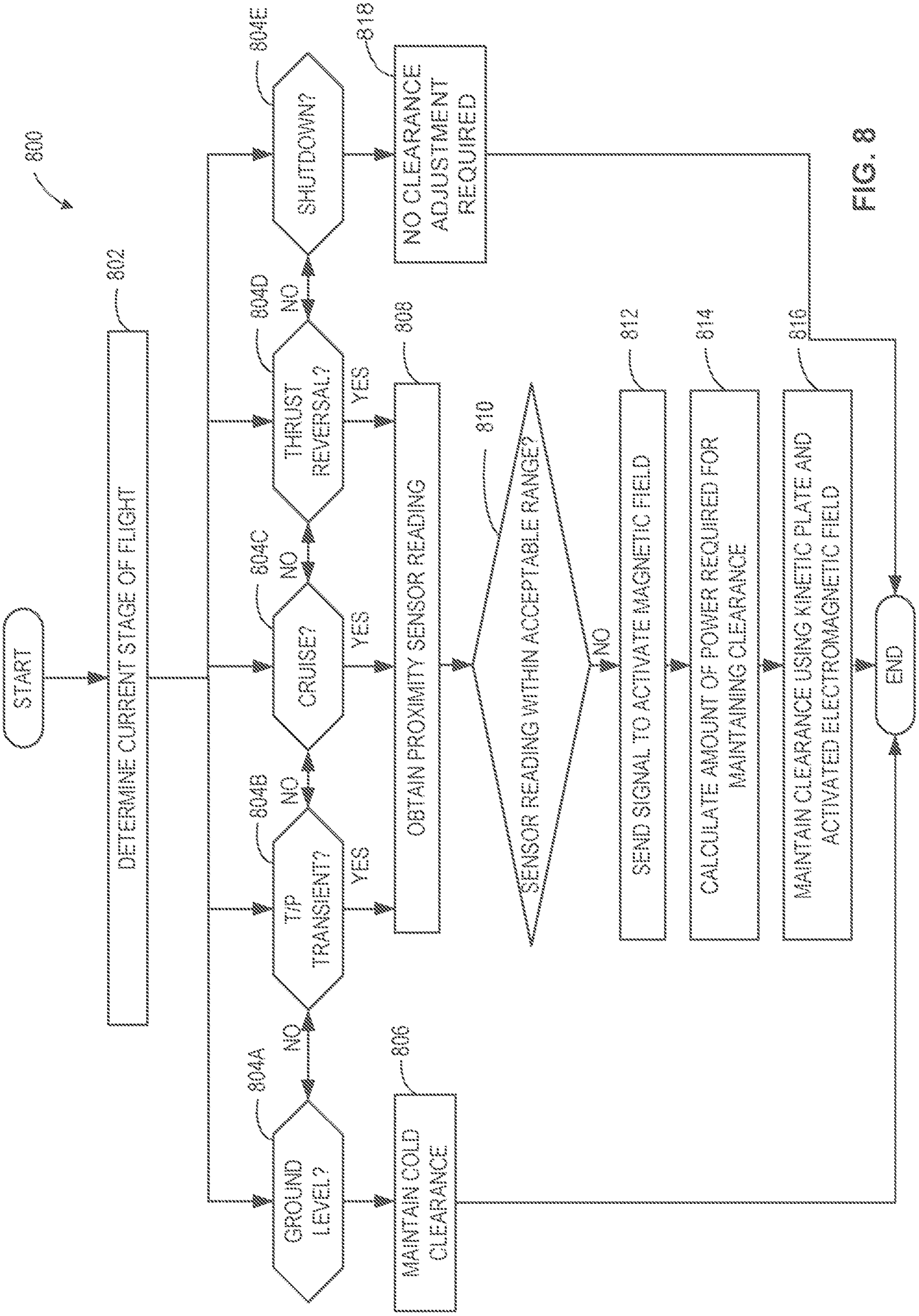

FIG. 8 is a flowchart representative of example machine readable instructions and/or example operations 800 that may be executed and/or instantiated by processor circuitry to provide a response to mitigate blade tip loss, based on a determined current flight condition (e.g., stage of flight), as performed by the examples of FIGS. 6A and/or 6B. The machine readable instructions and/or the operations 800 of FIG. 8 begin at block 802, at which the processor circuitry 912 shown in the example processor platform 900 discussed below in connection with FIG. 9 causes the proximity sensors to detect the width of the clearance 216 of FIG. 2.

As illustrated in FIG. 8, at block 802, the processor circuitry 912 determines the current stage of flight. In examples disclosed herein, the stages of flight may include an aircraft stationed at ground level, an aircraft in takeoff/transient aircraft, cruise, thrust reversal, and/or shutdown.

At block 804A, the processor circuitry 912 checks whether the aircraft is at ground level (e.g., ground level stage of flight). When the processor circuitry 912 determines that the aircraft is indeed at ground level, the process moves to block 806. However, when the processor circuitry 912 determines that the aircraft is not at ground level, the process may move to any one of blocks 804B, 804C, 804D, and/or 804E.

At block 804B, the processor circuitry 912 checks whether the aircraft is in takeoff or is transient (e.g., takeoff/transient stage of flight). When the processor circuitry 912 determines that the aircraft is in takeoff or is transient, the process moves to block 808. However, when the processor circuitry 912 determines that the aircraft is not in takeoff and is not transient, the process may move to any one of blocks 804A, 804C, 804D, and/or 804E.

At block 804C, the processor circuitry 912 checks whether the aircraft is in cruise (e.g., cruise stage of flight). When the processor circuitry 912 determines that the aircraft is in cruise, the process moves forward to block 808. However, when the processor circuitry 912 determines that the aircraft is not in cruise, the process may move to any one of blocks 804A, 804B, 804D, and/or 804E.

At block 804D, the processor circuitry 912 checks whether the aircraft is in thrust reversal (e.g., thrust reversal stage of flight). When the processor circuitry 912 determines that the aircraft is in thrust reversal, the process moves forward to block 808. However, when the processor circuitry 912 determines that the aircraft is not in thrust reversal, the process may move to any one of blocks 804A, 804B, 804C, and/or 804E.

At block 804E, the processor circuitry 912 checks whether the aircraft is in shutdown (e.g., shutdown stage of flight). When the processor circuitry 912 determines that the aircraft is in shutdown, the process moves forward to block 818. However, when the processor circuitry 912 determines that the aircraft is not in shutdown, the process may move to any one of block 804A, 804B, 804C, and/or 804D.

At block 806, upon determination by the processor circuitry 912 at block 804A that the current stage of flight is ground level, cold clearance is maintained. In examples disclosed herein, cold clearance refers to a state in which the magnetic field is not in activation, but rather, the springs (e.g., first spring 212A and/or second spring 212B of FIG. 2) are used to mechanically-maintain clearance width (e.g., using the wedge-shaped coupling 500 of FIG. 5).

At block 808, upon determination by the processor circuitry 912 at block 804B that the current stage of flight is takeoff/transient, the processor circuitry 912 obtains a reading from the example proximity sensor 602 of FIGS. 6A and/or 6B. In examples disclosed herein, this proximity sensor reading may indicate a width of the example clearance 216 of FIG. 2 (e.g., 0.010 inches, 0.005 centimeters, etc.).

At block 810, the processor circuitry 912 determines whether the sensor reading obtained in block 808 falls within an acceptable range. In examples disclosed herein, the acceptable range may be marked by an example minimum threshold (e.g., 0.005 inches, 0.006 inches, 0.007 centimeters, 0.008 centimeters) and an example maximum threshold (e.g., 0.010 inches, 0.011 inches, 0.012 centimeters, 0.013 centimeters), indicating an example minimum and/or maximum width of the clearance 216 that is acceptable to mitigate blade tip loss. In examples disclosed herein, a controller may be used to drive proximity sensor readings and/or the resulting transmission of signal for activation and/or deactivation of the magnetic field.

At block 812, a signal is sent by the processor circuitry 912 to activate the magnetic field. In examples disclosed herein, the signal is sent to the Full Authority Digital Engine Control (FADEC) of the aircraft, which controls a power supply from which current can be sent to activate the magnetic field.

At block 814, the processor circuitry 912, calculates the amount of power (e.g., current) required by the example magnetic field generating system 400 of FIG. 4, to generate the magnetic field for clearance control.

At block 816, current is supplied by FADEC to the example magnetic field generating system 400 of FIG. 4, and clearance is maintained (e.g., the clearance is actively adjusted in response to proximity sensor readings)

At block 818, upon determination by the processor circuitry 912 that the current stage of flight is shutdown, the processor circuitry 912 establishes that no clearance adjustment is necessary.

Figure 9:
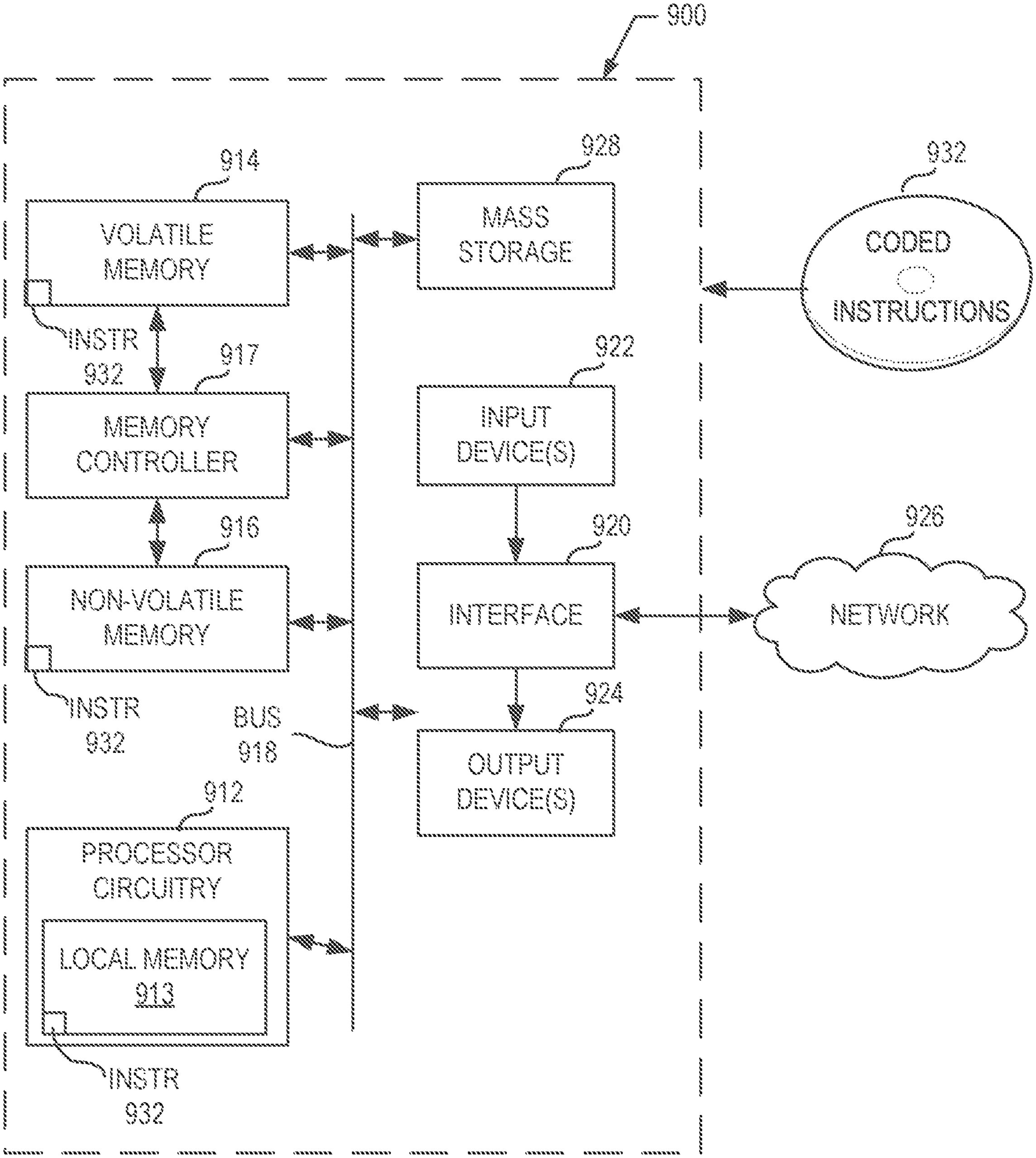
FIG. 9 is a block diagram of an example processing platform including processor circuitry structured to execute the example machine readable instructions and/or the example operations of FIGS. 7-8 to implement the example electromagnetically-actuated clearance control system of FIG. 2.

FIG. 9 is a block diagram of an example processor platform 900 structured to execute and/or instantiate the machine readable instructions and/or the operations of FIGS. 7-8 to implement the example second electromagnetically-actuated clearance control system 600 of FIGS. 6A and/or 6B. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912.

One or more output devices 924 are also connected to the interface circuitry 920 of the illustrated example. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 932, which may be implemented by the machine readable instructions of FIGS. 7-8, may be stored in the mass storage device 928, in the volatile memory 914, in the non-volatile memory 916, and/or on a removable non-transitory computer readable storage medium such as a CD or DVD.

Examples disclosed herein include electromagnetically-actuated clearance control systems. The examples disclosed herein mitigate the rotor blade tip loss by employing a dynamic clearance widening and/or narrowing response to blade tip expansion and/or retraction during changing flight conditions. Examples disclosed can reduce the cost of continual replacement of rotor blades of gas turbine engines by reducing significant contact between the rotor blades and fan casing. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the present disclosure are provided by the subject matter of the following clauses:

Example 1 includes an electromagnetically-actuated clearance control system for a gas turbine engine comprising an electromagnetic coil coupled to a first end of a facesheet, the electromagnetic coil to generate a magnetic field in response to a connection of a power supply, and a ferromagnetic sheet coupled to a second end of the facesheet, the ferromagnetic sheet drawn radially-inward toward the electromagnetic coil when the magnetic field is generated, a first end of the ferromagnetic sheet coupled to a first compression spring and a second end of the ferromagnetic sheet coupled to a second compression spring, the first and second compression springs to compress in response to the ferromagnetic sheet being drawn radially-inward.

Example 2 includes the electromagnetically-actuated clearance control system of any preceding clause, wherein the electromagnetic coil is a plurality of electromagnets, a first and second electromagnet of the plurality of electromagnets configured to repel against each other when connected to the power supply.

Example 3 includes the electromagnetically-actuated clearance control system of any preceding clause, wherein the first electromagnet is coupled to the first compression spring and the second electromagnet is coupled to a kinetic plate.

Example 4 includes the electromagnetically-actuated clearance control system of any preceding clause, wherein the kinetic plate is further to move radially-inward in response to a measured clearance satisfying a maximum threshold, and move radially-outward in response to the measured clearance satisfying a minimum threshold.

Example 5 includes the electromagnetically-actuated clearance control system of any preceding clause, wherein the clearance is measured using a proximity sensor.

Example 6 includes the electromagnetically-actuated clearance control system of any preceding clause, wherein the first and second compression springs decompress to move the ferromagnetic sheet radially-outward, in response to deactivation of the magnetic field.

Example 7 includes the electromagnetically-actuated clearance control system of any preceding clause, wherein the magnetic field is deactivated in response to a reading of the proximity sensor.

Example 8 includes the electromagnetically-actuated clearance control system of any preceding clause, wherein the facesheet contains a honeycomb structure to provide sound dampening.

Example 9 includes the electromagnetically-actuated clearance control system of any preceding clause, wherein the first and second electromagnets of the plurality of electromagnets are configured to move with a different displacement than a third and fourth electromagnet of the plurality of electromagnets.

Example 10 includes the electromagnetically-actuated clearance control system of any preceding clause, wherein the difference in displacement causes the kinetic plate to tilt.

Example 11 includes a gas turbine comprising a compressor including a compressor casing and a plurality of compressor blades, the compressor casing defining first and second compressor casing slots, a turbine, comprising a turbine casing and a plurality of turbine blades, a shaft rotatably coupling the compressor and the turbine, and a shroud for at least one of the compressor or the turbine, the shroud comprising an electromagnetic coil coupled to a first end of a facesheet, the electromagnetic coil to generate a magnetic field in response to a connection of a power supply, and a ferromagnetic sheet coupled to a second end of the facesheet, the ferromagnetic sheet drawn radially-inward toward the electromagnetic coil when the magnetic field is generated, a first end of the ferromagnetic sheet coupled to a first compression spring and a second end of the ferromagnetic sheet coupled to a second compression spring, the first and second compression springs to compress in response to the ferromagnetic sheet being drawn radially-inward.

Example 12 includes the apparatus of any preceding clause, wherein the electromagnetic coil is a plurality of electromagnets, a first and second electromagnet of the plurality of electromagnets configured to repel against each other connected to the power supply.

Example 13 includes the apparatus of any preceding clause, wherein the first electromagnet is coupled to the first compression spring and the second electromagnet is coupled to a kinetic plate.

Example 14 includes the apparatus of any preceding clause, wherein the kinetic plate is further to move radially inward in response to a measured clearance satisfying a maximum threshold, and move radially-outward in response to the measured clearance satisfying a minimum threshold.

Example 15 includes the apparatus of any preceding clause, wherein the clearance is measured using a proximity sensor.

Example 16 includes the apparatus of any preceding clause, wherein the first and second compression springs decompress to move the ferromagnetic sheet radially-outward, in response to deactivation of the magnetic field.

Example 17 includes the apparatus of any preceding clause, wherein the magnetic field is deactivated in response to a reading of the proximity sensor.

Example 18 includes the apparatus of any preceding clause, wherein the facesheet contains a honeycomb structure to provide sound dampening.

Example 19 includes the apparatus of any preceding clause, wherein the first and second electromagnets of the plurality of electromagnets are configured to move with a different displacement than a third and fourth electromagnet of the plurality of electromagnets.

Example 20 includes the apparatus of any preceding clause, wherein the difference in displacement causes the kinetic plate to tilt.

The following claims are hereby incorporated into this Detailed Description by this reference, with each claim standing on its own as a separate embodiment of the present disclosure.

What is claimed is:

1. An electromagnetically-actuated clearance control system, comprising:
- a first electromagnet in a fan case;
- a kinetic plate coupled to a second electromagnet arranged in a magnetically repelled position relative to the first electromagnet;
- a controller to generate a signal that causes the kinetic plate to move radially in response to a measured clearance between the kinetic plate and a blade tip;
- a third electromagnet in the fan case; and
- a fourth electromagnet coupled to the kinetic plate, the fourth electromagnet arranged in a magnetically repelled position relative to the third electromagnet.

2. The electromagnetically-actuated clearance control system of claim 1, wherein the first and second electromagnets are to repel with a different displacement than the third and fourth electromagnets to provide a variable clearance from the kinetic plate to the blade tip.

3. The electromagnetically-actuated clearance control system of claim 1, wherein the measured clearance is measured by a proximity sensor placed along an edge of the kinetic plate.

4. The electromagnetically-actuated clearance control system of claim 1, wherein an electromagnetic field generated to repel the first and second electromagnets is changed by an electric supply from the controller.

5. The electromagnetically-actuated clearance control system of claim 4, wherein the measured clearance is measured by a proximity sensor placed along an edge of the kinetic plate, the measured clearance input to the controller.

6. The electromagnetically-actuated clearance control system of claim 1, wherein the first electromagnet is suspended by a spring.

7. The electromagnetically-actuated clearance control system of claim 1, further including an abradable layer on the kinetic plate.

8. The electromagnetically-actuated clearance control system of claim 1, further including an electromagnetic shield on the kinetic plate.

9. The electromagnetically-actuated clearance control system of claim 1, wherein the kinetic plate includes a fiber material.

10. A gas turbine engine with a controllable clearance between a fan case and a fan blade, the gas turbine engine including:
- a first electromagnet in the fan case;
- a kinetic plate coupled to a second electromagnet, the second electromagnet arranged in a magnetically repelled position relative to the first electromagnet;
- a full authority digital engine control system to measure a clearance from the kinetic plate to a tip of the fan blade, the full authority digital engine control system to generate a signal that causes the kinetic plate to move radially in response to the measured clearance;
- a third electromagnet in the fan case; and
- a fourth electromagnet coupled to the kinetic plate, the fourth electromagnet arranged in a magnetically repelled position relative to the third electromagnet.

11. The gas turbine engine of claim 10, wherein the first and second electromagnets are to repel with a different displacement than the third and fourth electromagnets to enable a variable clearance from the kinetic plate to the tip of the fan blade.

12. The gas turbine engine of claim 10, wherein the measured clearance is measured by a proximity sensor placed along an edge of the kinetic plate.

13. The gas turbine engine of claim 10, wherein an electromagnetic field generated to repel the first and second electromagnets is changed by an electric supply from the full authority digital engine control system.

14. The gas turbine engine of claim 13, wherein the measured clearance is measured by a proximity sensor placed along an edge of the kinetic plate, the measured clearance input to the full authority digital engine control system.

15. The gas turbine engine of claim 10, wherein the first electromagnet is suspended by a spring.

16. The gas turbine engine of claim 10, further including an abradable layer on the kinetic plate.

17. The gas turbine engine of claim 10, further including an electromagnetic shield on the kinetic plate.

18. The gas turbine engine of claim 10, wherein the kinetic plate includes a fiber material.

* * * * *